Fig. 4.

A. G. MORETON.
CONTROLLING MECHANISM FOR INTERNAL COMBUSTION ENGINES.
APPLICATION FILED MAR. 12, 1914.

1,158,000. Patented Oct. 26, 1915.
4 SHEETS—SHEET 4.

Witnesses:

Inventor:
Alfred G. Moreton,
by
His Attorney.

UNITED STATES PATENT OFFICE.

ALFRED G. MORETON, OF ERIE, PENNSYLVANIA, ASSIGNOR TO GENERAL ELECTRIC COMPANY, A CORPORATION OF NEW YORK.

CONTROLLING MECHANISM FOR INTERNAL-COMBUSTION ENGINES.

1,158,000.  Specification of Letters Patent.  Patented Oct. 26, 1915.

Application filed March 12, 1914. Serial No. 824,288.

*To all whom it may concern:*

Be it known that I, ALFRED G. MORETON, a citizen of the United States, residing at Erie, county of Erie, State of Pennsylvania, have invented certain new and useful Improvements in Controlling Mechanism for Internal-Combustion Engines, of which the following is a specification.

The present invention relates to controlling mechanism for internal combustion engines and especially to the type operating on the high compression cycle with crude oil as fuel. When such an engine is employed to drive an electric generator at variable speeds to supply current to the motors of a self propelled vehicle it is necessary, for the most efficient operation, to provide a starting means, a means for controlling the effective delivery of the pump or pumps to the fuel injector or injectors, a means for changing the period of opening of the fuel valve or valves, and a means for reducing the cylinder compression at starting when for any reason it becomes necessary or desirable.

The object of my invention is to provide an improved construction and arrangement of parts whereby a single handle or lever suffices to control all of the above specified means.

My invention also comprises certain novel features and combinations whereby certain parts commonly considered necessary are done away with and improved operating results are obtained.

For a consideration of what I believe to be novel and my invention, attention is directed to the accompanying description and claims appended thereto.

In the accompanying drawings which illustrate one of the embodiments of my invention.

Figures 1, 12:
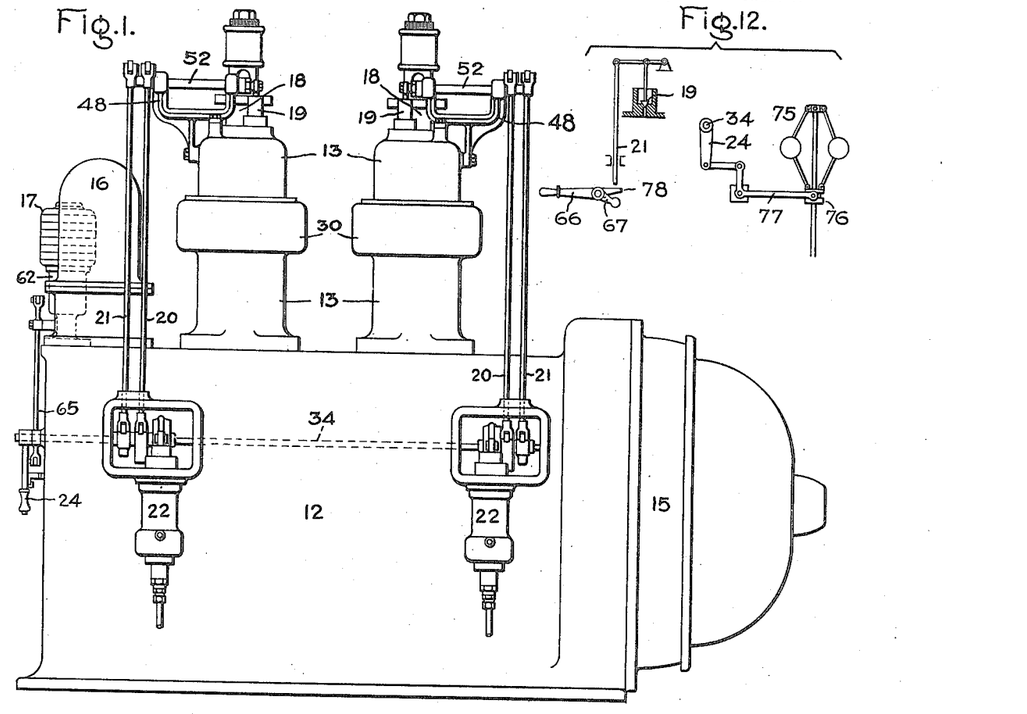
Figure 1 is a view in side elevation of an internal combustion engine provided with my improved governing mechanism.
Fig. 12 is a detail view showing a speed governor for moving the control shaft.
Figure 4:
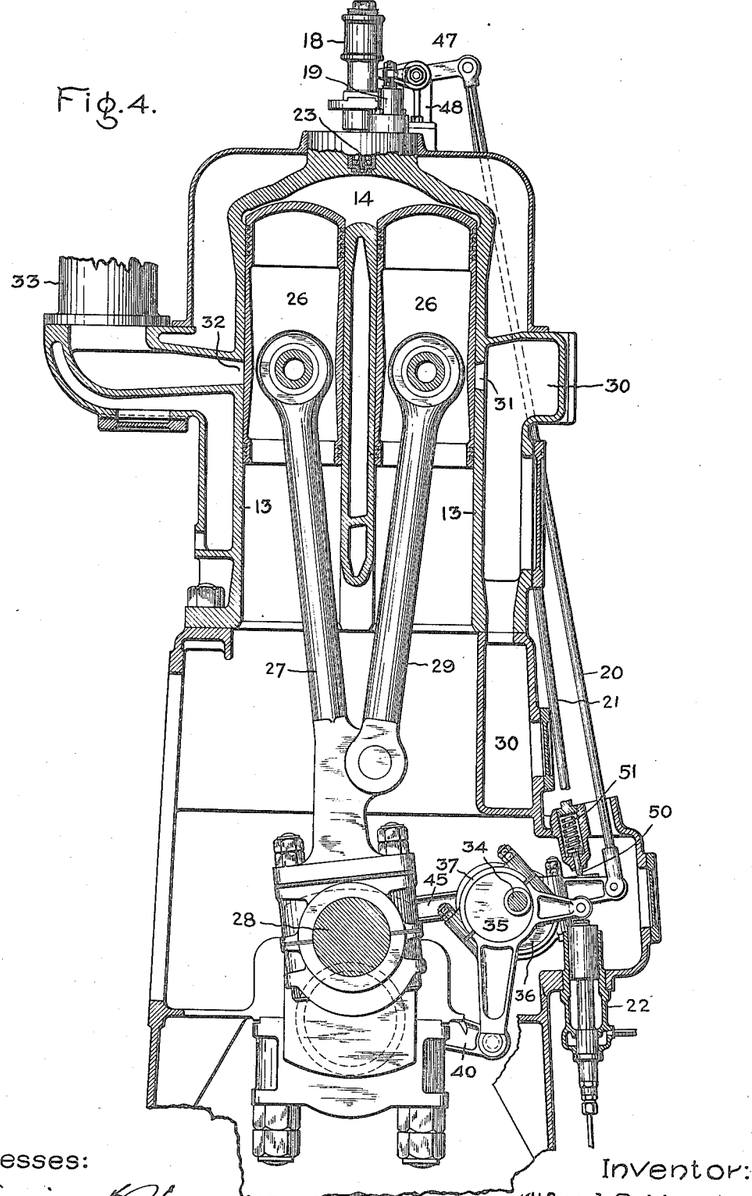
Fig. 4 is a vertical section of the engine in the plane of the cylinder.

Referring to Fig. 1, 12 indicates the base of the engine upon which are mounted cylinders 13. The cylinders are arranged in pairs and each pair is provided with a common combustion chamber 14 as shown in Fig. 4. The engine is arranged to drive the rotor of the electric generator 15 although it can be used for other purposes if desired. At the left of the cylinders and mounted on the base is a two stage air compressor 16 inclosed in a suitable casing for supplying air to inject the fuel. Below the compressor is a scavenging pump 16$^a$; air is admitted to the pump through the silencer 17. Each combustion chamber is provided with a fuel valve 18 and a compression relieving valve 19, Fig. 5. These valves are operated by the rods 20 and 21 in a manner to be described hereinafter. 22 indicates a fuel pump for supplying fuel to the fuel injector 23, Fig. 4, and from which its escape is controlled by the valve 18, said injector being of the atomizing type. 24 indicates a controlling handle or lever which is mounted on the control shaft 34, said handle being arranged to control the effective delivery of the fuel pump, the period of opening of the fuel valve, and the action of the compression relieving valve.

Figures 2, 3:
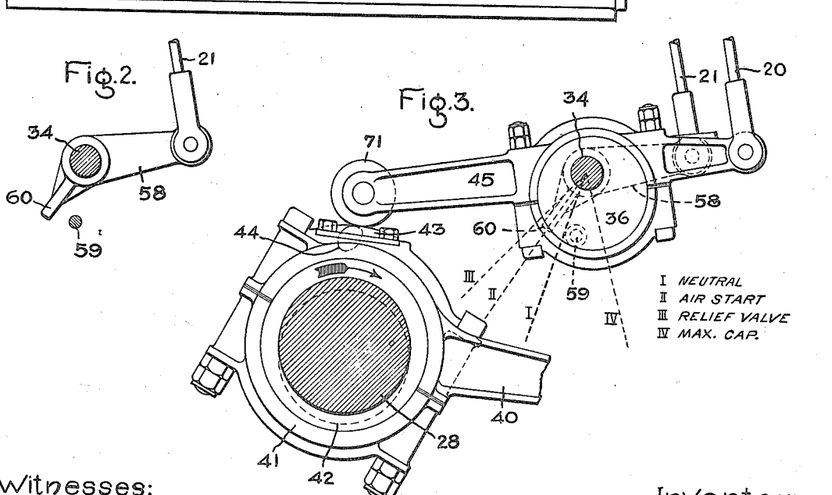
Fig. 2 is a detailed view of a means for actuating the compression relieving valve.
Fig. 3 is a detailed view showing the eccentric on the main shaft and the lever means for actuating the fuel valve.
Figure 5:
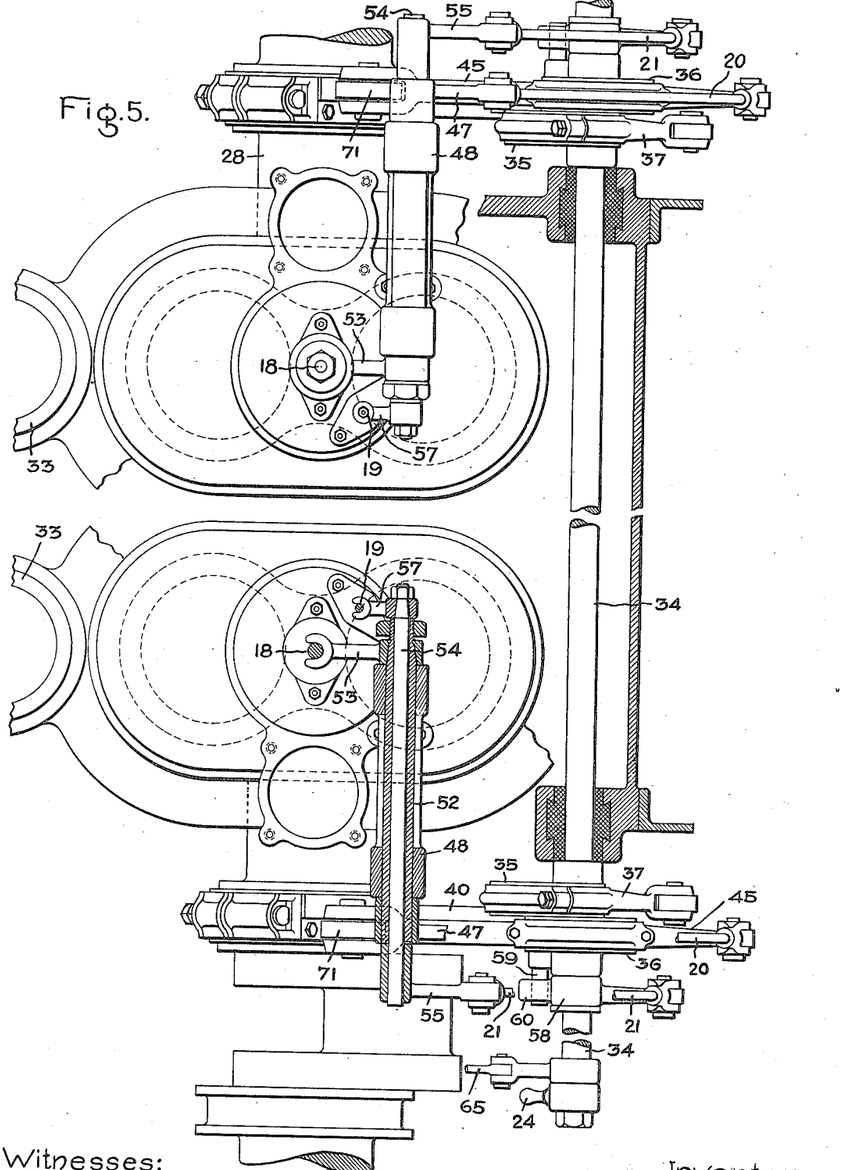
Fig. 5 is a partial plan view showing the relation of the control shaft and the various parts controlled thereby.

Referring to Figs. 4 and 5, each cylinder is provided with a piston 26. The left-hand piston is connected by a rod 27 with the crank 28 on the main shaft. The right-hand piston is connected by a shorter rod 29 with the rod 27. These pistons are arranged to move simultaneously within the cylinders. 30 indicates a compressed air receiver which receives air from the scavenging pump 16$^a$ and supplies it to the cylinder port or ports 31 for scavenging purposes. These ports are controlled by the right-hand piston. 32 indicates an exhaust port or ports from which exhaust gases escape to the exhaust pipe 33. The exhaust ports are controlled by the left-hand piston. The ports are so arranged that the scavenging air sweeps through the cylinders and combustion chamber in series. Extending parallel with the main shaft is a control shaft 34 and mounted thereon are eccentrics 35 and 36 for each set of working cylinders. Since the arrangement for one cylinder is a duplicate of the other, a description of the part at one end of the engine will be sufficient. Mounted on the eccentric 35 is a bell crank lever 37. One arm of the lever is arranged to engage and depress the plunger of the fuel pump 22, as shown more particularly in Figs. 7 to 9. The other arm of the lever is connected to the rod 40 of eccentric strap 41, Fig. 3. This strap surrounds the eccentric 42 on the main shaft. As the eccentric rotates it imparts a vibratory motion to the bell crank lever 37 first depressing and then releasing the plunger of the fuel pump. The detailed construction of the pump is immaterial. It is sufficient for the present purpose to say that the downward and forcing movement of the plunger is accomplished by the lever 37 and its upward movement by a spring. The pump plunger has a stroke of constant length but its region of reciprocation is varied by varying the region of vibration of the bell crank lever. This latter is obtained by turning the control shaft 34 and the eccentric 35 as will appear more fully hereinafter.

In order to actuate the fuel valve 18 and at the same time avoid the necessity of a separate cam shaft I utilize the movement of the eccentric 42. To this end a cam 43 is mounted on the upper side of the eccentric strap 41, Fig. 3. This cam has an orbital motion as indicated by the broken and dotted lines 44. Mounted on the eccentric 36 on the control shaft is a lever 45 for actuating the fuel valve 18 through the pull rod 20 and lever 47, the latter being supported by a bracket 48 on the head of the engine. As the eccentric 42 rotates the cam 43 will strike the roller on the fuel lever 45 once for each revolution of the main shaft and in so doing pull the rod 20 and open the fuel valve 18. It will thus be seen that the eccentric 42 has a double purpose or function, thereby enabling me to simplify the apparatus and reduce the number of parts.

In order to vary the amount of fuel discharged by the pump the control shaft is turned in its bearing by the handle 24. When the handle stands in position I indicated by the dotted line I in Fig. 3 the parts are in the neutral position. As the handle is moved from this position toward dotted line position IV the eccentric 35 will be lowered with the result that the region of reciprocation of the pump plunger is lowered and hence a greater amount of fuel is discharged on each working stroke. The turning of the eccentric 35 also results in changing the angular position of the cam 43 which actuates the fuel valve lever 45.

In order to prevent the left-hand end of the fuel lever 45 from following the complete movement of the cam 43 and its supporting eccentric strap an abutment 50, Fig. 4, is provided which is normally held in the position shown by the coiled compression spring 51. The abutment acts as a guide upon which the lever 45 is free to slide back and forth as the position of the control shaft is changed. The effect of this is to keep the right-hand end of the lever at practically the same elevation at all times when not engaged by the cam 43. It is to be noted that the eccentrics 35 and 36 occupy different angular positions on the control shaft so that as 35 is lowered by turning the control shaft in an anti-clockwise direction which carries cam 43 to the right, the eccentric 36 lowers roller 71 and carries it to the right, the two actions taking place simultaneously.

Referring to Fig. 5, 34 indicates the control shaft and 35 the eccentric for the bellcrank fuel lever 37. 36 indicates the eccentric for the fuel lever 45, and 20 the rod for actuating the fuel valve 18. 48 indicates the bracket in which is mounted a tubular shaft 52. This shaft is connected to the lever 47 at one end and is provided with an arm 53 at the other end, said arm being provided with a fork which embraces the stem of the fuel valve 18. Located within the tubular shaft is a shaft 54 which is connected at one end to the arm 55, the latter being connected to the rod 21 for actuating the compression relief valve. On the opposite end of the shaft 54 is a forked arm 57 which embraces the stem 19 of the compression relief valve 19.

The means for operating the compression relief valve through the action of the control handle 24 will now be described. Loosely mounted on the control shaft 34 is a lever 58, Figs. 2 and 5. Mounted on the adjacent eccentric 36 is a pin 59, the latter engaging the arm 60 of the lever 58 after the eccentric has been moved a predetermined distance. In other words, the pin acts on the compression relieving valve through lost motion so that it will only be actuated when the handle 24 is moved to a definite predetermined position, i. e. to position III. When the parts 59 and 60, however, engage, the lever 58 is moved clockwise and in so doing motion is imparted by the rod 21 to the arm 55, Fig. 5, shaft 54, forked arm 57 and the compression relief valve 19. For starting the engine from a position of rest, I utilize the scavenging pump 16ᵃ the piston of which forms a continuation of the pistons of the air compressor 16, Fig. 6. Under normal operating conditions the scavenging pump receives its air from silencer 17 and after being compressed to a predetermined degree is delivered to the receiver 30, Fig. 4. Inside of the casing 62 which supports the silencer is a tubular ported valve 63 by means of which the admission of atmospheric air can be cut off and air under relatively high pressure admitted to the cylinder of the scavenging pump to drive it as an air motor, it being understood that the piston of the scavenging pump is direct connected to the main crank shaft. In order to actuate the tubular ported valve 63 to shut off the atmospheric suction and admit compressed air an arm 64 is mounted on the control shaft 34 and is connected by a rod 65 with the arm 66. Mounted on the pivot of said arm is a valve lifter 67 shown in dotted lines. Between the valve lifter and the stem of the valve is a certain amount of lost motion so that the valve will only be operated when the lever is moved to a predetermined position; i. e., when the handle is moved in the position II.

Figure 7:
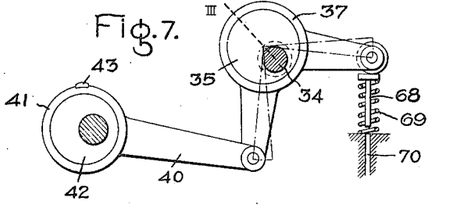
Figs. 7, 8 and 9 are detailed views showing the various positions of the pump actuating parts.
Figure 8:
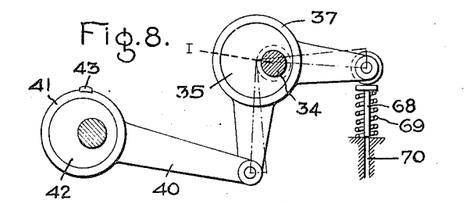
Figure 9:
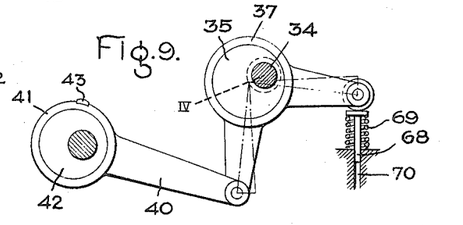
Figure 10:
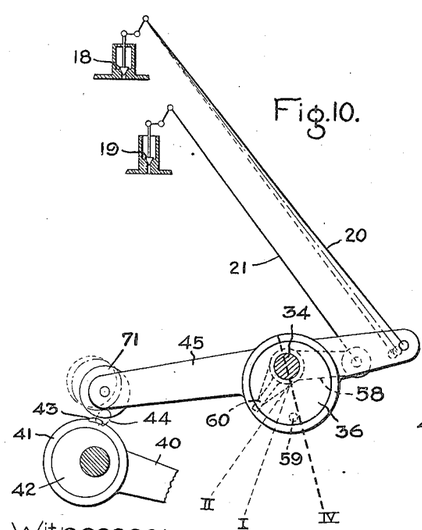
Figs. 10 and 11 are diagrammatic views showing different positions of the fuel and compression relieving valves and means for actuating the same.

Referring particularly to Figs. 7 to 9 I have illustrated diagrammatically the operation of the pump. In Fig. 8 the center line of the eccentric occupies the position indicated by the dotted line I which corresponds to the position I of the handle 24. The movements of the eccentric 42 are just sufficient to cause the lever arm 37 to depress the plunger 68 of the fuel pump to the position shown, said pump being of the displacement type. The upward movement of the plunger is accomplished by the spring 69. 70 indicates the cylinder of the pump and the amount of fuel that is displaced on each working stroke of the plunger depends upon the distance that the plunger enters the cylinder. In Fig. 9 IV indicates the center line of the eccentric and this position corresponds to position IV of the handle 24. With the parts in this position the pump is delivering the maximum amount of fuel. In Fig. 7 the center line of the eccentric is indicated by dotted line III and corresponds to position III of the control handle 24. That is to say, the relief valve 19 in one or both of the working cylinders has been opened and compressed air has been admitted to the scavenging pump for starting. These three figures also clearly indicate the changing of the angular position of the cam 43 as the action of the pump is varied to change the period of opening of the fuel valve. Since the position of the cam 43 is changed by turning the eccentric 35 and the position of the fuel lever 45 is changed by turning the eccentric 36 it follows that the period of opening of the fuel valve is responsive to the joint action of the two. These parts are so related one to the other that as the load increases the period of opening of the fuel valve is progressively increased. The object of this arrangement is to prevent the compressed air in the working cylinders, which is relied upon to fire the fuel charge, from being unduly chilled at light loads by the blast air which injects the fuel and also to conserve the supply of blast air under said light load operating conditions. When the cam 43 is moved in a clockwise direction, the period of opening of the fuel valve is increased, but said valve always starts to open at the same angular position of the crank. The valve will remain open for a longer or shorter time depending on the amount the roller 71 cuts the path of cam 43. The reason for this may be understood from Figs. 7 to 9 which illustrate eccentric 42 in the same relative angular positions. As eccentric 35 is lowered by turning the control shaft in an anti-clockwise direction, cam 43 is carried to the right. Simultaneously eccentric 36, Fig. 10, is moved in a direction to lower roller 71 and also to move it to the right, thereby bringing roller 71 deeper into the path of cam 43. On account of this harmonic motion the eccentric 42 is always in the same angular position the instant cam 43 makes contact with roller 71. The effect of this is to open the fuel valve 18, when the crank is at the same angular position with respect to the inner dead center position of the working pistons 26 but for shorter or longer periods, depending upon the direction of movement of the control shaft.

Figure 11:
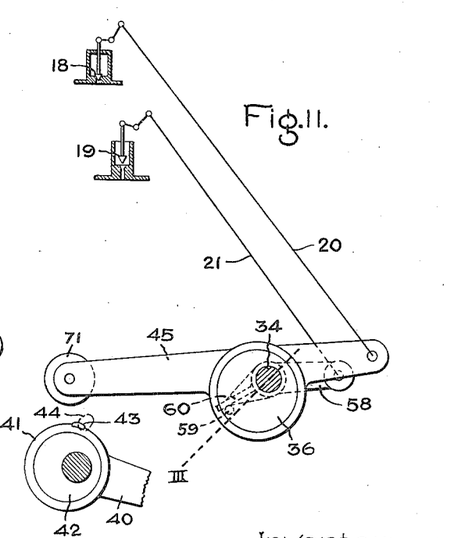

In Figs. 10 and 11 is illustrated diagrammatically the operation of the fuel valve and lever 45 and also the compression relief lever 58. In Fig. 10 the full and broken-and-dotted and dotted lines indicate three different operating conditions. When the handle is in the position corresponding to II the roller 71 occupies the position shown in dotted lines and is out of the path of the cam 43, this being the air starting position. When the roller occupies the broken-and-dotted line position the starting handle 24 will occupy the position indicated by dotted line I and the roller 71 will be tangent with path of cam 43. The pull rod 20 also occupies the broken-and-dotted line position. When the handle 24 is moved to position IV the roller 71 is in engagement with the cam 43 for the maximum length of time and the fuel valve 18 is held open for the maximum time. During these various operations the lever 58 and pin 59 have been idle but when the handle 24 is moved to the position corresponding to dotted line position III, Fig. 11, of the eccentric 36 the pin 59 engages the arm 60 of the lever 58 and pulls the rod 21 downward thus opening the relief valve 19 and breaking the compression in the working cylinders, the fuel valve 18 meanwhile remaining in its closed position. From this figure it will also be seen that at this time the roller 71 on the fuel valve lever is out of the path of movement of the cam 43.

Figure 6:
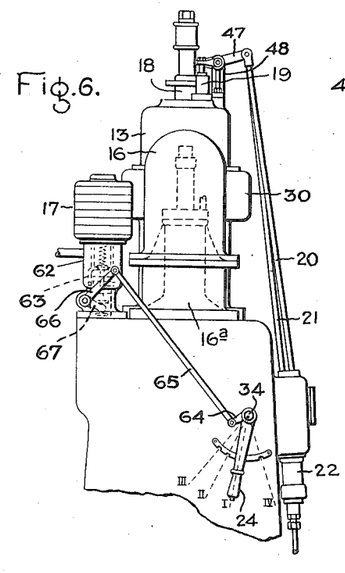
Fig. 6 is a detailed view in end elevation of the engine showing the arrangement of the hand lever for adjusting the control shaft.

Briefly stated, the operation of my improved mechanism is as follows: Assuming the engine is in starting position the hand lever 24 is moved to the position II. This opens valve 63 and admits compressed air to the piston of the scavenging pump. If the engine does not start readily under these conditions the handle is moved to the position III which breaks the compression in the working cylinders after which the engine starts. The handle is then moved to position II and after running for a moment or two the handle is moved to a position slightly to the right of position I. This shuts off the supply of compressed air to the scavenging pump and also admits atmospheric air to the scavenging pump. At or about this instant the fuel pumps begin to deliver fuel to the fuel injectors from which it passes into the combustion chambers subject to the control of the fuel valves 18, these valves being controlled by the action of the cam 43 on the roller 71 carried by the lever 45. As the load on the engine increases or if it be desired to increase the speed of the engine, the load remaining the same, the handle 24 is progressively moved to the right until the proper operating conditions are obtained. The result of this is to increase the amount of fuel delivered on each working stroke of the pump plunger and also to increase the period of opening of the fuel valve. This action continues until the hand lever is moved to position IV when the maximum output of the engine is obtained. Instead of controlling the engine by hand I may use a speed governor as shown in Fig. 12. In this figure 75 indicates the speed governor which may be of any suitable type and is driven from the main shaft. The sliding collar 76 is connected to a bell-crank lever 77 which in turn is connected to the lever 24 that turns the control shaft 34. With this arrangement the parts 64 and 65 of Fig. 6 are omitted. The lever 66 is directly operated by hand and lever 67 operates the starting valve as before. The lever 66 also opens the compression relieving valve 19 through the arm 78 and rod 21. there being a certain amount of lost motion between the lower end of the rod and the arm so that the valve will not be opened until the hand lever has been moved to a predetermined position.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, an internal combustion engine, a fuel valve therefor, a pump supplying fuel to the valve, a starting means, a means for controlling the effective delivery of the pump, a fuel valve timing means which always opens the fuel valve at the same time and varies the time of closing, and a lever common to and controlling the starting means, pump controlling means and valve timing means.

2. In combination, an internal combustion engine, a fuel valve therefor, a pump supplying fuel to the valve, a starting means, a means for controlling the effective delivery of the pump, a means for changing the period of opening of the fuel valve, a compression reducing means, and a lever common to and controlling the starting means, pump controlling means, valve timing means and compression reducing means.

3. In combination, an internal combustion engine and its main shaft, a fuel valve therefor, a pump supplying fuel to the valve, a control shaft having eccentrics mounted thereon, a pump actuating lever pivotally supported on one of the eccentrics, an eccentric means on the main shaft for vibrating the pump lever, a lever for actuating the fuel valve that is mounted on an eccentric on the control shaft, a cam driven by the main shaft for moving the fuel lever, and a handle for turning the control shaft to change the angular positions of its eccentrics and thereby vary the action of the levers on their coöperating parts.

4. In combination, an internal combustion engine and its main shaft, a fuel valve therefor, a pump supplying fuel to the valve, a control shaft having eccentrics mounted thereon, a pump actuating lever pivotally supported on one of the eccentrics, an eccentric mounted on the main shaft, a strap and rod for the eccentric, said rod and lever being pivotally united, a fuel valve actuating lever mounted on an eccentric on the control shaft, and a cam carried by said strap for actuating the valve lever.

5. In combination, an internal combustion engine and its main shaft, a fuel valve therefor, a pump supplying fuel to the valve, a pivotally supported pump actuating lever, an eccentric on the main shaft, a strap for the eccentric which is connected to and actuates said lever, a fuel valve lever, and a cam carried by the eccentric strap for moving the fuel valve lever at predetermined times.

6. In combination, an internal combustion engine and its main shaft, a fuel valve therefor, a pump supplying fuel to the valve, a pump actuating lever, an eccentric on the main shaft, a strap for the eccentric which is connected to and actuates said lever, a fuel valve lever, a cam carried by the eccentric strap for moving the fuel valve lever, a fulcrum for each of said levers, and means common to said fulcra for adjusting them to change the effective delivery of the pump and the period of opening of the fuel valve.

7. In combination, an internal combustion engine and its main shaft, a fuel valve therefor, a pump supplying fuel to the valve, a control shaft having eccentrics mounted thereon, a pump actuating lever pivotally supported on one of the eccentrics, an eccentric mounted on the main shaft, a strap and rod for the eccentric, said rod and pump lever being pivotally united, a fuel valve actuating lever mounted on an eccentric on the control shaft, a cam carried by said strap for actuating the valve lever, and a means for turning the control shaft and its eccentrics to vary the action of the levers on their coöperating parts.

8. In combination, an internal combustion engine and its main shaft, a fuel valve therefor, a pump supplying fuel to the valve, a control shaft having eccentrics mounted thereon, a lever mounted on one of the eccentrics, one end of which imparts motion to the fuel pump, an eccentric on the main shaft, a strap and rod moved by the eccentric, said rod being pivotally connected to the pump lever for vibrating it, a lever mounted on an eccentric on the control shaft for actuating the fuel valve, a cam on the said strap for actuating the valve lever, and means for turning the control shaft and its eccentrics to change the position of the fulcra of said levers.

9. In combination, an internal combustion engine and its main shaft, a fuel valve, an actuating lever therefor, a cam driven in synchronism with the main shaft for moving the lever, and means for changing the angular position of the cam with respect to the shaft.

10. In combination, an internal combustion engine and its shaft, a fuel valve, an actuating lever therefor, an eccentric on the shaft, a strap therefor, a cam on the strap for moving the lever, and means for adjusting the strap angularly with respect to the eccentric.

11. In combination, an internal combustion engine and its shaft, a fuel pump, an actuator therefor, a valve controlling the passage of fuel from the pump to the engine, a lever for actuating the valve, an eccentric which forms the fulcrum for the lever, a cam driven by the shaft for moving the lever, and means for simultaneously turning the eccentric and adjusting the cam angularly with respect to the shaft.

12. In combination, an internal combustion engine and its main shaft, a fuel pump, an actuating lever therefor, a fuel valve, an actuating lever therefor, a control shaft, eccentrics on the control shaft forming fulcra for the levers which are so positioned that as one moves its lever the other lowers its lever to vary the effective discharge of the pump and the period of opening of the fuel valve, means for turning the control shaft, and means for moving the levers on their fulcra.

13. In combination, an internal combustion engine and its shaft, a fuel admitting valve, a lever, one end of which moves the valve, a cam acting on the other end of the lever to move it, an eccentric forming the fulcrum for the lever, means for turning the eccentric to raise and lower one end of the lever, and means acting on the other end of the lever and coöperating with the eccentric to hold it in a predetermined position.

14. In combination, an internal combustion engine, a fuel valve therefor, a pump supplying fuel to the engine subject to the control of the valve, means controlling the effective delivery of the pump, a lever for actuating the fuel valve, an eccentric fulcrum therefor, an eccentric on the engine shaft, a strap therefor, a cam on the strap for moving the fuel valve lever, and means for simultaneously adjusting the pump controlling means and also the angular positions of the eccentric fulcrum and the eccentric strap and its cam.

15. In combination, an internal combustion engine, a fuel valve therefor, a compression reducing valve, a lever for actuating the fuel valve, means for moving the lever, an eccentric forming the fulcrum for the lever, a control shaft to which the eccentric is rigidly secured, a lever loosely mounted on the shaft for operating the compression reducing valve, means forming a lost-motion connection between the eccentric and the compression reducing valve, and means for turning the control shaft to a position to put the fuel valve lever out of action and the compression reducing valve lever into action.

16. In combination, an internal combustion engine and its shaft, a fuel pump, a lever for actuating it, a fuel valve, a lever for actuating it, a starting valve, a lever for actuating it, a control shaft forming a fulcrum for the starting valve lever, eccentrics on the control shaft forming fulcra for the fuel valve and pump levers, a lost-motion connection between one of the eccentrics and the starting valve lever, and means for turning the control shaft and eccentrics to a predetermined position to put the pump and fuel valve out of operation and the starting valve into operation, and to an initial position to put the starting valve out of operation and by further movement in the same direction to progressively vary the amount of fuel delivered by the pump and vary the period of opening of the fuel valve.

17. In combination, an internal combustion engine, a fuel pump, an actuator therefor, a fuel valve, an actuator therefor, a starting valve, an actuator therefor, a control shaft that is common to the actuators, means responsive to a movement of the control shaft to cut the pump and fuel valve out of operation and the starting valve into operation, and to a different movement of the control shaft to put the starting valve out of operation and the pump and fuel valves into operation, and to progressively increase the period of opening of the fuel valve as the effective delivery of the pump is increased.

18. In combination, an internal combustion engine, a fuel valve, a means for supplying fuel thereto, a lever for actuating the valve, an eccentric forming a fulcrum for the lever, a second eccentric driven by the engine, a fuel cam moved thereby, and means for adjusting the angular positions of both eccentrics to vary the period of opening of the fuel valve.

19. In combination, an internal combustion engine, a fuel valve, a means for supplying fuel thereto, a lever for actuating the valve, an eccentric forming a fulcrum for the lever, a second eccentric on the engine shaft, a strap therefor, a cam mounted on the strap, and means for simultaneously adjusting the angular position of the first eccentric and that of the strap and cam to vary the period of opening of the fuel valve.

20. In combination, an internal combustion engine, a fuel valve, a compression relief valve, said valves opening into the engine cylinder, a tubular shaft for operating one of the valves, a second shaft located within the tubular shaft for operating the other valve, a control shaft, lever means mounted on the control shaft which are connected to the first named shafts, and means for actuating the lever means.

21. In combination, an internal combustion engine and its main crank shaft, a fuel valve therefor, a pump supplying fuel to the valve, a lever for opening the fuel valve, an adjustable fulcrum therefor, a cam driven from the main shaft for actuating said lever, and means for simultaneously adjusting the angular position of said cam relative to the shaft and said fulcrum for timing the fuel valve to always open at the same angular position of the crank shaft and to close earlier or later according to the amount of fuel to be injected.

22. In combination, an internal combustion engine, a fuel valve therefor, a pump supplying fuel to the valve, a starting means, a means for controlling the effective delivery of the pump, a lever common to and controlling the starting means and pump controlling means, said lever controlling the starting means through one range of movement and the pump controlling means through another range of movement, and valve timing means also controlled by said lever for changing the period of opening of the fuel valve throughout the range of movement which controls the pump controlling means.

23. In combination, an internal combustion engine, a fuel valve therefor, a compression reducing valve, a lever for actuating the fuel valve, means for moving the lever, an eccentric forming the fulcrum for the lever, a control shaft to which the eccentric is rigidly secured, a lever loosely mounted on the shaft for operating the compression reducing valve, means forming a lost-motion connection between the eccentric and the compression reducing valve, a starting valve, a lever for actuating it, and means for turning the control shaft to a position to put the fuel valve lever out of action and the starting valve lever into action.

In witness whereof, I have hereunto set my hand this tenth day of March, 1914.

ALFRED G. MORETON.

Witnesses:
HERMANN LEMP,
O. T. FOUCHE.

It is hereby certified that in Letters Patent No. 1,158,000, granted October 26, 1915, upon the application of Alfred G. Moreton, of Erie, Pennsylvania, for an improvement in "Controlling Mechanism for Internal-Combustion Engines," an error appears in the printed specification requiring correction as follows: Page 2, line 4, for the word "ports" read *parts;* and that the said Letters Patent should be read with this correction therein that the same may conform to the record of the case in the Patent Office.

Signed and sealed this 23rd day of November, A. D., 1915.

[SEAL.]

J. T. NEWTON,

*Acting Commissioner of Patents.*

Cl. 123—179.